United States Patent
Alrabeiah et al.

(10) Patent No.: US 10,534,964 B2
(45) Date of Patent: Jan. 14, 2020

(54) PERSISTENT FEATURE DESCRIPTORS FOR VIDEO

(71) Applicant: BlackBerry Limited, Waterloo (CA)

(72) Inventors: Muhammad Rabeiah M Alrabeiah, Hamilton (CA); Jun Chen, Hamilton (CA); Dake He, Waterloo (CA); Liangyan Li, Tianjin (CN); Yingchan Qiao, Hamilton (CA); Yizhong Wang, Tianjin (CN); Ting Yin, Hamilton (CA)

(73) Assignee: BlackBerry Limited, Waterloo, Ontario (CA)

( * ) Notice: Subject to any disclaimer, the term of this patent is extended or adjusted under 35 U.S.C. 154(b) by 43 days.

(21) Appl. No.: 15/419,281

(22) Filed: Jan. 30, 2017

(65) Prior Publication Data
US 2018/0218222 A1   Aug. 2, 2018

(51) Int. Cl.
*G06K 9/00* (2006.01)
(52) U.S. Cl.
CPC ..... *G06K 9/00744* (2013.01); *G06K 9/00718* (2013.01); *G06K 9/00758* (2013.01); *G06K 9/00765* (2013.01)
(58) Field of Classification Search
None
See application file for complete search history.

(56) References Cited

U.S. PATENT DOCUMENTS

| | | | | |
|---|---|---|---|---|
| 8,885,887 B1* | 11/2014 | Chen | | G06T 7/246 345/611 |
| 2009/0087023 A1* | 4/2009 | Porikli | | G06T 7/277 382/103 |
| 2009/0175538 A1* | 7/2009 | Bronstein | | G06F 17/30799 382/173 |
| 2010/0128789 A1* | 5/2010 | Sole | | G06T 5/005 375/240.16 |
| 2012/0123780 A1 | 5/2012 | Gao et al. | | |
| 2013/0071031 A1* | 3/2013 | Huang | | G06K 9/46 382/190 |
| 2013/0216135 A1* | 8/2013 | Pau | | G06K 9/6218 382/190 |

(Continued)

OTHER PUBLICATIONS

Yakkali et al., International Journal of Advanced Research in Computer Science and Software Engineering 5(3), Mar. 2015, pp. 683-688.*

(Continued)

*Primary Examiner* — Andrae S Allison
(74) *Attorney, Agent, or Firm* — Rowand LLP (57) ABSTRACT

Methods and devices for extracting feature descriptors for a video, the video having a sequence of pictures. The method includes identifying a first key picture and a second key picture later in the sequence than the first key picture; extracting a first set of feature descriptors from the first key picture and a second set of feature descriptors from the second key picture; identifying a set of pairs of feature descriptors, where each pair includes one descriptor from the first set and one descriptor from the second set; generating motion information describing the motion field between the first key picture and the second key picture; and filtering the set of pairs of feature descriptors based on correlation with the motion information to produce and output a subset of persistent descriptors.

23 Claims, 8 Drawing Sheets

(56) References Cited

U.S. PATENT DOCUMENTS

| | | | | |
|---|---|---|---|---|
| 2014/0028850 | A1* | 1/2014 | Keating | G06T 19/006 348/158 |
| 2014/0037140 | A1* | 2/2014 | Benhimane | G06K 9/6211 382/103 |
| 2014/0037152 | A1* | 2/2014 | Tan | G06K 9/00597 382/117 |
| 2014/0119598 | A1* | 5/2014 | Ramachandran | G06T 11/60 382/103 |
| 2014/0226864 | A1* | 8/2014 | Venkatraman | G01C 21/20 382/107 |
| 2016/0267359 | A1* | 9/2016 | Gan | G06K 9/6215 |
| 2016/0277645 | A1* | 9/2016 | Bitouk | G06K 9/00765 |
| 2016/0335487 | A1* | 11/2016 | Ming | G06K 9/00335 |

OTHER PUBLICATIONS

Brox, Thomas, and Jitendra Malik. "Large displacement optical flow: descriptor matching in variational motion estimation." IEEE transactions on pattern analysis and machine intelligence 33.3 (2011): 500-513.*

Xuelong Hu, Yingcheng Tang and Zhenghua Zhang, "Video object matching based on SIFT algorithm," 2008 International Conference on Neural Networks and Signal Processing, Nanjing, 2008, pp. 412-415. (Year: 2008).*

De Souza Barbieri, Tamires Tessarolli, and Rudinei Goularte. "KS-SIFT: a keyframe extraction method based on local features."  Multimedia (ISM), 2014 IEEE International Symposium on. IEEE, 2014. (Year: 2014).*

Heng Wang, Alexander Kläser, Cordelia Schmid, Cheng-Lin Liu. Dense trajectories and motion boundary descriptors for action recognition. [Research Report] RR-8050, INRIA. 2012. hal-00725627v2 (Year: 2012).*

N15339, Call for Proposals for Compact Descriptors for Video Analysis—Search and Retrieval, Warsaw, PL, 2015.

D. G. Lowe, "Object recognition from local scale-invariant features," in Proc. of the International Conference on Computer Vision , Kerkyra, Greek, 1999.

M25929, "CDVS CE2: Local Descriptor Compression Proposal," Stockholm, Sweeden, 2012.

B. D. Lucas and T. Kanade, "An Iterative Image Registration Technique with an Application to Stereo Vision," in International Joint Conference on Artificial Intelligence, 1981.

D. G. Lowe, "Distinctive image features from scale-invariant keypoints," International journal of computer, pp. 91-110, 2004.

N14961, "Test Model 12: compact descriptors for visual search," 2014.

D. Tian, H. Sun and A. Vetro, Keypoint Trajectory Coding on Compact Descriptor for Video Analysis (CDVA), San Diego, CA, USA: ISO/IEC JTC 1/SC 29/WG11 m37854, 2016.

H. Wang and e. al, "Dense trajectories and motion boundary descriptors for action recognition," International journal of computer vision, vol. 103, pp. 60-79, 2013.

N15338, "Evaluation Framework for Compact Descriptors for Video Analysis Search and Retrieval," Warsaw, Poland, 2015.

A. Aaron and M. Watson, "Netflix on future video coding," ISO/IEC JTC 1/SC 29/WG11 m35771, Geneva, CH, 2015.

"Dirac Specification," http://wayback.archive.org/web/20150503015104/ http://diracvideo.org/download/specification/dirac-spec-latest.pdf, 2008.

M. Bhaskaranand and J. D. Gibson, "Distributions of 3D DCT coefficients for video," in Proc. ICASSP, 2009.

D. He, "Improved Intra Prediction for Image and Video Coding," 49996-ID, 2015.

G. Bjontegaard, Calculation of average PSNR differences between RD-curves, Austin, TX, USA: VCEG-M33, 2001.

VP8 data format and decoding guide, IETF RFC6386, 2011.

H. Wang, A. Klaser, C. Schmid and C. Liu, "Dense trajectories and motion boundary descriptors for action recognition," International journal of computer vision, vol. 103, pp. 60-79, 2013.

EPO, Partial European Search Report relating to EP application No. 18153243.3, dated Jun. 26, 2018.

P.H.S. Torr et al.: "Feature Based Methods for Structure and Motion Estimation" In: "Vision Algorithms: Theory and Practice" Jan. 1, 2000, XZhang et al.: "Video Stabilization Based on Saliency Driven SIFT Matching and Discriminative RANSAC", Internet Multimedia Computing and Service, Aug. 5, 2011,XP055109876.

Ter Haar et al.: "Detection of Moving Objects From a Moving Platform in Urban Scenes", Proceedings of the SPIE—Smart Structures and Materials 2005: Smart Electronics, Mems, Biomems, and Nanotechnology Proceedings of the SPIE, vol. 7701, Apr. 15, 2010, XP055484998.

Chudoba et al.: "Exploration and Mapping Technique Suited for Visual-features Based Localization of MAVs", Journal of Intelligent and Robotic Systems, vol. 84, No. 1, Mar. 15, 2016, pp. 351-369, XP036118032.

Zhang et al.: "Video Stabilization Based on Saliency Driven SIFT Matching and Discriminative RANSAC", Internet Multimedia Computing and Service, Aug. 5, 2011,XP058005783.

European Search Report dated Nov. 13, 2018, Application No. 18153243.3.

Wolf. W. Ed., :Institute of Electrical and Electronics Engineers: "Key Frame Selection by Motion Analysis", May 1, 1996.

\* cited by examiner

PERSISTENT FEATURE DESCRIPTORS FOR VIDEO

FIELD

The present application generally relates to feature descriptors for video, such as may be used in object recognition or analysis and, in particular, methods and systems for extracting and identifying persistent feature descriptors.

BACKGROUND

Feature detection and extraction was developed for image processing to identify objects (features) within an image. This may be useful as a part of computer vision, image search, object recognition, and other such image-analysis systems. The act of feature detection involves identifying points or areas of potential interest in an image (e.g. edges, corners, etc.), often using gradient analysis. The act of feature extraction involves generating a multi-dimensional vector representation of a small patch of the image containing the feature of interest. The resulting output of feature extraction is a feature descriptor.

Feature descriptors are then used, for example, in object recognition or image matching processes. For instance, the set of feature descriptors from an image may be stored in a query database containing sets of feature descriptors for a large number of images. This can enable such functions such as facial recognition, for example.

The concept of feature detection and extraction may also be extended to video, which may be considered a series of pictures. The Motion Picture Experts Group (MPEG) intends to standardize the descriptors for video as Compact Descriptors for Video Analysis (CDVA). MPEG is exploring tools for video processing and analysis with the goal of reducing "the data amount for the resulting video descriptors transmission or storage" and achieving "interoperability of implementations, applications and databases". Note that in MPEG CDVA, descriptors for a video sequence are extracted in a picture by picture (or frame by frame) manner, and then compressed.

The large number of feature descriptors that may be extracted from each picture of a video leads to a large data burden in identifying and storing and transmitting feature descriptors, even when compressed. It would be advantageous to provide for a system and method of feature descriptor extraction that maintains or improves the discriminative power (i.e. accuracy) of the feature descriptors while reducing or maintaining the number and complexity of the descriptors.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes methods and devices for extracting feature descriptors from a video. The methods and devices rely on temporal redundancy to identify "persistent descriptors", where a persistent descriptor is a feature descriptor of a feature that appears in multiple consecutive frames. Such a feature may be identified by determining that extracted feature descriptors from multiple consecutive frames are a sufficient match to each other that they likely relate to the same feature. Motion consistency checks may be used to ensure that persistent descriptors are consistent with the motion of the objects in the video. In some cases, persistent descriptors may be identified by matching extracted descriptors for two keyframes relating to a segment of video, where the keyframes are pictures at either end of the segment.

In a first aspect, the present application describes a method of extracting feature descriptors for a video, in a video feature descriptor extractor, the video including a sequence of pictures. The method includes identifying a first key picture and a second key picture later in the sequence than the first key picture; extracting a first set of feature descriptors from the first key picture and a second set of feature descriptors from the second key picture; identifying a set of pairs of feature descriptors, where each pair includes one descriptor from the first set and one descriptor from the second set; generating motion information describing the motion field between the first key picture and the second key picture; and filtering the set of pairs of feature descriptors based on correlation with the motion information to produce and output a subset of persistent descriptors.

In a further aspect, the present application describes a video feature extractor configured to implement such methods of video feature descriptor extraction.

In yet a further aspect, the present application describes non-transitory computer-readable media storing computer-executable program instructions which, when executed, cause one or more processors to perform the described methods of video feature descriptor extraction.

Other aspects and features of the present application will be understood by those of ordinary skill in the art from a review of the following description of examples in conjunction with the accompanying figures.

In the description that follows, some example embodiments may make reference to various feature extraction processes, i.e. algorithms for detecting and/or representing a localized feature in an image. A common example of such processes include the Scale-Invariant Feature Transform (SIFT). Other examples include Speeded-Up Robust Features (SURF), Gradient Location and Orientation Histogram (GLOH), Local Energy-based Shape Histogram (LESH), Histogram of Oriented Gradients (HOG). In general, a feature extractor or feature extraction process produces a feature descriptor, which is a multi-dimensional representation of the image data around a certain local feature.

Determining which features to extract or describe by way of feature descriptors may rely on any one or more of a number of feature detection processes or algorithms Example feature detection processes include edge detection, corner detection (sometime termed "interest" detection), blob detection, ridge detection, or other algorithms designed to identify areas of potential interest in an image that may be significance in recognizing a particular object in that image. Many such algorithms may use gradient analysis to identify points or areas of potential interest or significance. When the present application makes reference to "feature extraction", that is analyzing an image or picture to extract one or more feature descriptors, it is not intended to refer only to extraction (determining the descriptor) and may include feature detection as a part of the extraction process.

A SIFT descriptor, for example, is a region around a detected potential point of interest. The region is divided into sixteen rectangles from which 16 histograms of the orientation and magnitude of the gradients inside each rectangle are constructed. The descriptor is then formed as the concatenation of those sixteen histograms in a prescribed scan order of the rectangles.

Figure 8:
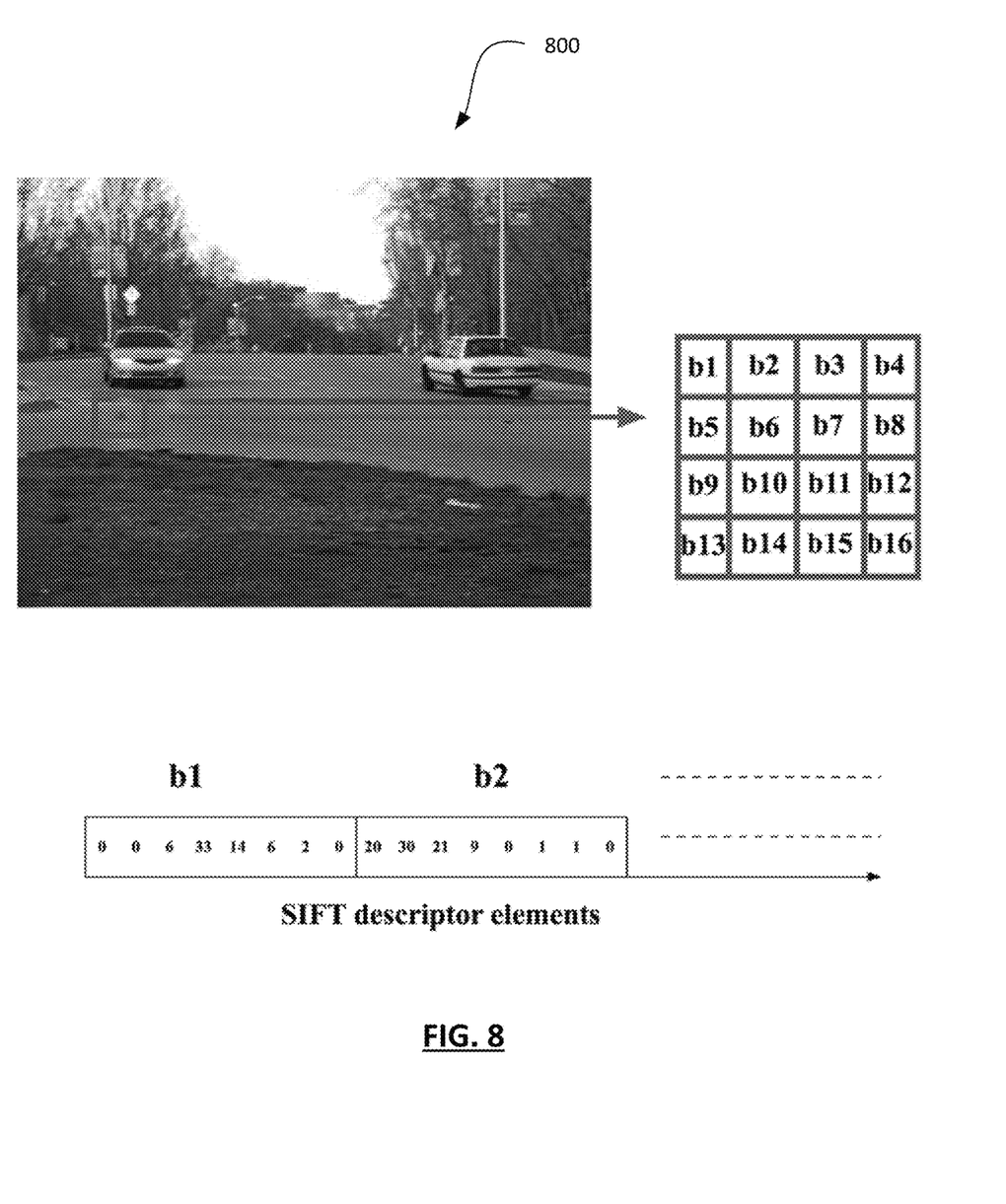
FIG. 8 illustrates an example extraction of a SIFT descriptor from a picture.

FIG. 8 shows an example of a picture 800 and a portion of an example SIFT descriptor extracted from that picture 800. A feature is identified and the region around it is divided into sixteen rectangles b1, b2, . . . , b16. A portion of the concatenated histograms (specifically, the example histograms for b1 and b2) is illustrated.

In the description that follows, when referring to video the terms frame, picture, slice, tile, quantization group, and rectangular slice group may be used somewhat interchangeably. Those of skill in the art will appreciate that a picture or frame may contain one or more slices or segments. A consecutive series of frames/pictures may be called a "sequence" in some cases. Other terms may be used in other video implementations.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Feature detection and extraction was developed for image processing to identify objects (features) within an image. This may be useful as a part of computer vision, image search, object recognition, and other such image-analysis systems. The act of feature detection involves identifying points or areas of potential interest in an image (e.g. edges, corners, etc.), often using gradient analysis. The act of feature extraction involves generating a multi-dimensional vector representation of a small patch of the image containing the feature of interest. The resulting output of feature extraction is a feature descriptor. As noted above, SIFT is one example of a feature extractor.

To locate and extract descriptors from a picture, SIFT uses the following steps:
  1. Identify and locate key points at regions and scales according to local variation.
  2. At each key point, represent the local image region by using multiple images representing each of a number of orientations. Such representations are robust to local geometric distortion. Note that sampling might be performed to accommodate the scale level of the key point.
  3. At each key point, a descriptor is extracted from the samples of the multiple images representing the local image region at the scale of the key point.

Given an image as input, SIFT might generate a large number of key descriptors. For example, hundreds of key descriptors may be extracted from an image of size 384×512 (196,608 pixels).

Those feature descriptors are then used, for example, in object recognition or image matching processes. For instance, the set of feature descriptors from an image may be stored in a query database containing set of feature descriptors for a large number of images. A new image may undergo feature extraction and a query system may attempt to find a match for those features in the query database by comparing the newly extracted feature descriptors from the new image to the stored sets of feature descriptors in the database. This can enable such functions as facial recognition, for example.

The concept of feature detection and extraction may also be extended to video, which is typically a series of pictures. However, as will be appreciated, video includes a large number of pictures, resulting in a large number of feature descriptors. MPEG intends to standardize the descriptors for video as Compact Descriptors for Video Analysis (CDVA). MPEG is exploring tools for video processing and analysis with the goal of reducing "the data amount for the resulting video descriptors transmission or storage" and achieving "interoperability of implementations, applications and databases". Note that in MPEG CDVA, descriptors for a video sequence are extracted in a picture by picture (or frame by frame) manner, and then compressed. That is, each picture in the video sequence is treated as a single image from which descriptors are located and extracted by using methods similar to SIFT. Inter-picture correlation is used in compression of descriptors after they are extracted from individual pictures.

Figure 1:
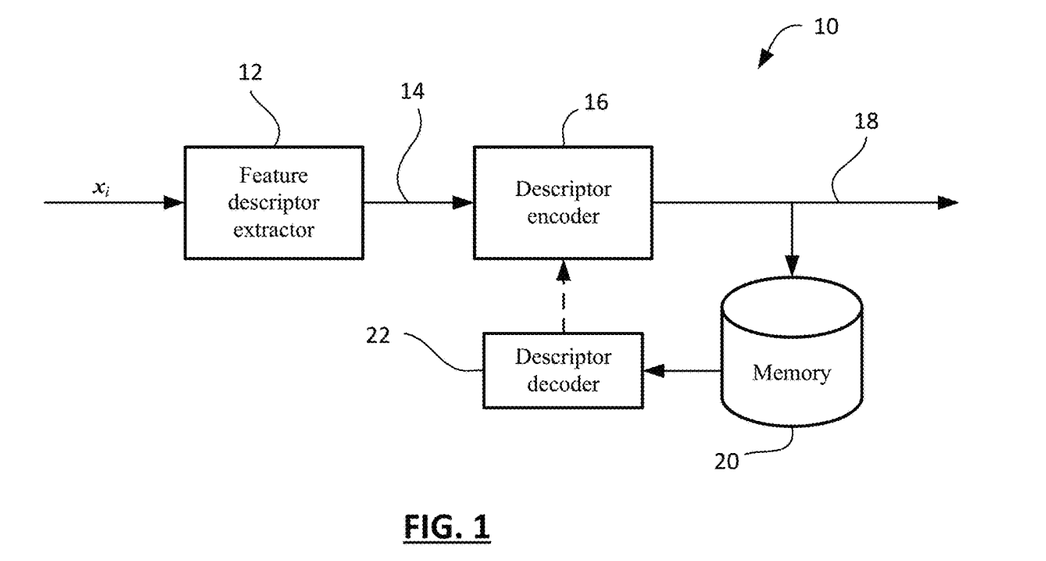
FIG. 1 shows a simplified Compact Descriptors for Video Analysis system.

FIG. 1 shows, in block diagram form, an example of a CDVA system 10. The CDVA system 10 uses SIFT-like feature descriptor extractor 12 and treat the video as a series of video frames or pictures. The output from the feature descriptor extractor 12 is a set of descriptors 14 for each frame/picture. Each set of descriptors is then, in this example, encoded by a descriptor encoder 16 to produce a bitstream of compact descriptors 18, which may then be stored in a database or other memory 20.

The system 10 may include a feedback loop in the encoding process to improve the compression of the descriptors through predictive coding. In such an example implementation the system 10 includes a descriptor decoder 22 that decodes the compact descriptors of previous pictures in the sequence. In FIG. 1, the dashed line indicates that it is optional to use descriptors from previous picture $x_{i-1}$ in coding of descriptors extracted from the current picture $x_i$. Further note that in FIG. 1 coding of descriptors may be lossy and involve quantization in some examples.

It could be advantageous to improve the balance of accuracy (discriminative power) and compression of feature descriptors. Accuracy of feature descriptors can be measured by an evaluation framework. For example, MPEG released a unified evaluation framework for video descriptors in 2015. In MPEG's example framework, discriminative accuracy (i.e. performance) may be evaluated by comparing two ratios. One ratio assesses true positives to false negatives. The other ratio assesses false positives to true negatives. An improved accuracy leads to improved query response accuracy. In addition, to the extent that accuracy may be maintained or improved while reducing the number of feature descriptors per image or per video results in greater performance and savings in bandwidth (for transmitting feature descriptors), computational resources (for processing queries), and storage requirements (for a query database or local image representations), as examples.

The present application proposes methods and systems aimed at improving the discriminative accuracy of feature descriptors for video and potentially reducing the quantity of such feature descriptors in characterizing a video sequence. To this end, the present application proposes to exploit the temporal nature of video in the feature extraction process in order to identify and extract more robust and discriminative feature descriptors.

The present application introduces the concept of "persistent" feature descriptors. A persistent feature descriptor (also termed "persistent descriptor" herein) is one which persists through two or more consecutive pictures in a video sequence. That is, a sequence of descriptors from successive video frames are collectively called a persistent descriptor for these video frames if the descriptors in the sequence match each other (i.e. they are within a prescribed distance of each other). In some embodiments, the persistent feature descriptors may further be tested against the motion field of the image and those that deviate from the motion field may be excluded as persistent descriptors. Experimental results on typical CDVA test video sequences show that a substantial portion of descriptors extracted from a video sequence are persistent.

Figure 2:
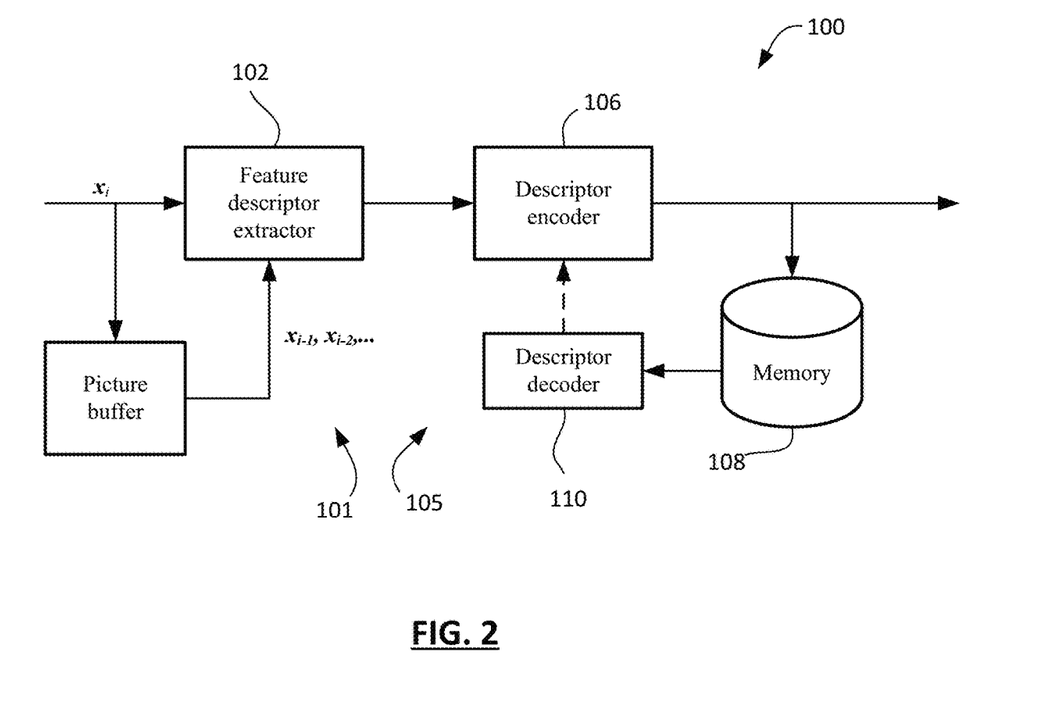
FIG. 2 shows, in block diagram form, an example of a video feature descriptor extractor system.

FIG. 2 shows, in block diagram form, one example of a video feature extractor 100 for producing a set of persistent descriptors characterizing a video sequence. The video feature extractor 100 includes an extraction component 101 and an encoding component 105. In some embodiments, the extractor 100 may exclude the encoding component 105 and may simply output unencoded sets of descriptors for storage, locally or remotely, or for generating one or more queries.

The encoding component 105 includes a descriptor encoder 106, a local storage or memory 108, and a descriptor decoder 110. The feedback loop containing the descriptor decoder 110 enables the encoding process to encode the descriptors predictively. That is the descriptor encoder 106 may encode current descriptors from a current image, based on decoded descriptors from an earlier image in the sequence. Note that this predictive coding operation relates to exploiting the temporal nature of the video pictures so as to improve the coding and compression of the descriptors themselves after they have been identified and extracted.

The extraction component 101 includes a descriptor extractor 102 and a picture buffer 104. The picture buffer 104 makes multiple pictures available to the descriptor extractor 102, thereby enabling the descriptor extractor 102 to perform descriptor matching across multiple successive pictures so as to identify persistent descriptors.

In one embodiment, a direct method of finding persistent descriptors in a video sequence is implemented by the descriptor extractor 102:

1. Extract all feature descriptors from every frame of the sequence.

2. Match the feature descriptors to identify the persisting ones that span the sequence (if any).

This two-step method represents a simple and accurate approach to obtaining a set of persistent descriptors for a given video sequence. It locates and identifies descriptors based on spatiotemporal features and relevance to the content; however, it is computationally expensive. The complexity comes as a result of the need to process every frame independently to extract all feature descriptors and to search through the extracted descriptors for matches.

In another embodiment, rather than searching every frame or picture of a video sequence, the sequence is first analyzed to identify keyframes. By analyzing frame correlation, the sequence may be divided into segments exhibiting high frame correlation among the frames of the segment. The keyframes may be the first and last of the pictures in the segment. In another embodiment, the keyframes are the first of the pictures in a segment, such that for any one segment, the keyframes for that segment are its first picture and the first picture from the next segment in the sequence. High frame correlation suggests that two frames could produce a set that encompasses the majority of the persistent descriptors. This has been shown experimentally to be true. Hence, this solution extracts descriptors from two frames in a segment (referred to as the keyframes), not all of them. The search for persistent descriptors may then be carried out between the descriptors of these two keyframes. The search may employ both geometric and motion information in some embodiments. The terms "keyframes", "key frames" and "key pictures" are used interchangeably herein.

Persistent descriptors are usually detected on different objects in the scene, some of which are moving and others are stationary. Descriptor-tracking experiments have shown that, in both cases, persistent descriptors exhibit the same motion field as that of their objects, e.g., if a descriptor is detected on a stationary object appearing in few consecutive frames, it will not exhibit any location change throughout these frames. Such motion compliance helps detect and preserve descriptors pertaining to salient objects—salient objects are those existing in multiple frames and conveying the main information of the scene.

Figure 9:
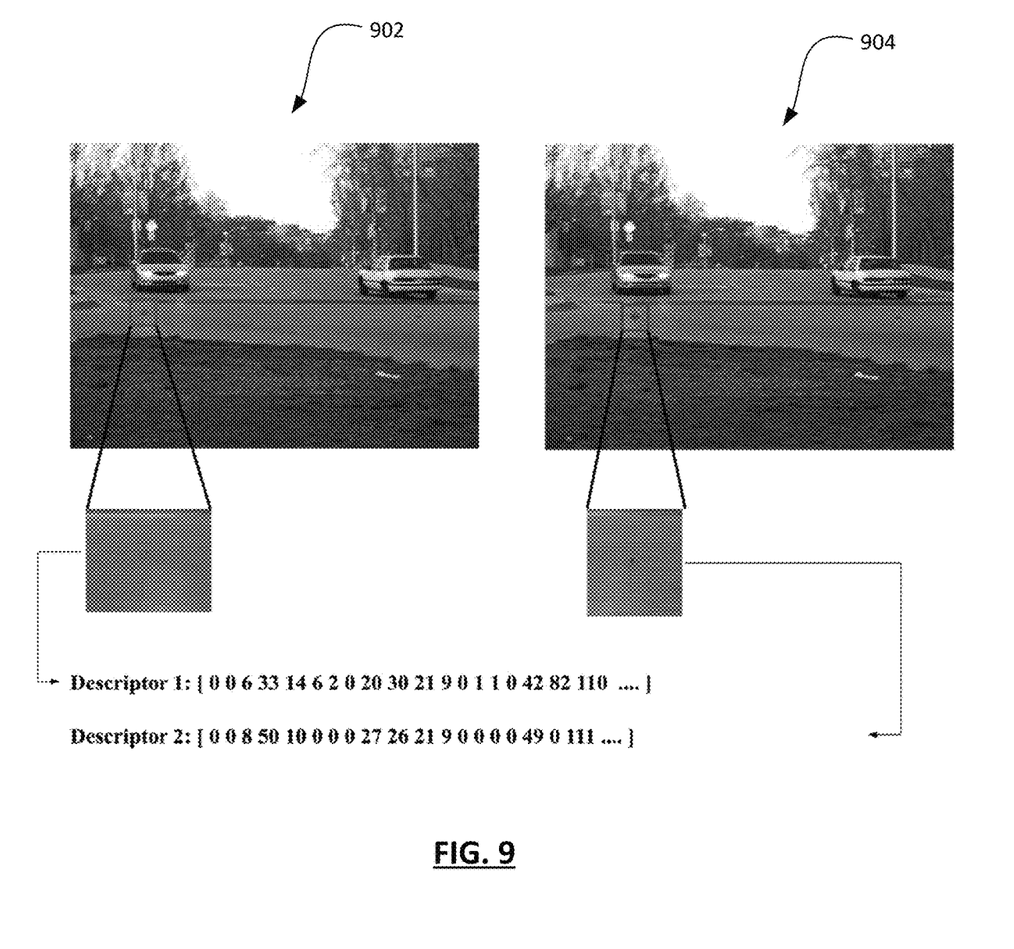
FIG. 9 illustrates an example of a persistent descriptor.

Reference is now briefly made to FIG. 9, which illustrates an example of a persistent descriptor. FIG. 9 features two pictures: a first picture 902 and a second picture 904. In some examples, the first picture 902 and the second picture 904 are consecutive pictures in the video. In some examples, the first picture 902 may be a first keyframe and the second picture may be a second keyframe 904 for a given segment of the video. The identified feature and its regions in the two respective pictures 902, 904 are shown below the pictures. The beginning portion of the feature descriptors (e.g. SIFT) extracted from the respective pictures 902, 904 is shown as Descriptor 1 and Descriptor 2. Descriptor 2 is matched (paired) to Descriptor 1 on the basis of its similarity to Descriptor 1 (non-identical, but within a certain Euclidean distance). The pairing of the two descriptors as relating to the same feature may be tested for consistency with the motion field to validate the pairing.

In this example embodiment, the process of feature extraction implemented by the feature extractor 102, may be given by:

S1. Select a pair of frames $x_{k_1}$ and $x_{k_2}$ from a video sequence as keyframes, where $k_2 > k_1$ are indices of the two video frames.

S2. Extract feature descriptors from $x_{k_1}$ and $x_{k_2}$ (e.g. by using SIFT).

S3. Generate motion information from $x_{k_1}$ to $x_{k_2}$ (e.g. by using motion estimation).

S4. Match descriptors extracted in Step S2 above according to the motion information generated in Step S3 above. The matched descriptors are labelled as persistent descriptors for video frames $x_{k_1} x_{k_1+1} \ldots x_{k_2}$.

Note that in Step S1 above, the selection of $x_{k_1}$ and $x_{k_2}$ might depend upon motion information to make sure motion field is not interrupted between the selected pair of keyframes. In other words, S1 might include scene change detection to select keyframes.

In S3 above, motion information from $x_{k_1}$ to $x_{k_2}$ may be generated by using traditional block-based motion estimation methods typically used in video coding, where a picture is partitioned into blocks and a motion vector is identified for each block. In some embodiments, optic flow algorithms may be used to determine motion information to be used in S4.

The above-described solution analyses the motion field and defines descriptors with respect to both spatial and temporal features by following the motion field. As such, the solution enables extraction of generalized descriptors that capture temporal structures. By using generalized descriptors the solution allows for locating and identifying key regions, e.g., flat areas with temporal fluctuations, that otherwise may not be located by using image-based descriptor extraction schemes. A motion field is a 2D vector field for describing the motion of objects in a video sequence or segment. The motion field may be determined or estimated using an optical flow algorithm in some cases.

Figure 3:
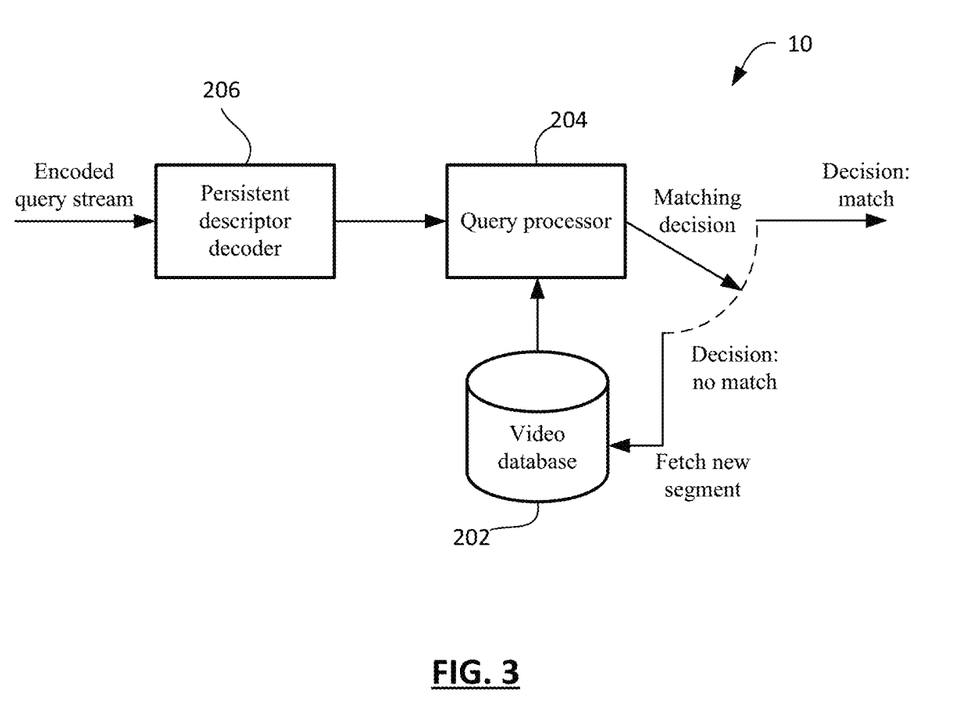
FIG. 3 shows, in block diagram form, an example of a query system for object recognition in video.

As noted above, the set of persistent descriptors output by the video feature extractor 100 may be used in a query system. Reference is now made to FIG. 3, which shows, in block diagram form, one example embodiment of a query system 200 for recognition in video. The system 200, in this example, includes a video database 202 containing sets of persistent feature descriptors for a number of video segments. The system 200 may be for determining whether a video segment has a match in the database 202; that is, whether there is a video segment that shows the same features. This can be used for object recognition in some implementations.

The system 200 includes a query processor 204 that receives the query data, which in this case includes the persistent descriptors for the video segment that is the subject of the query. The system 200 may include a decoder 206 if the persistent descriptors are encoded. The query processor 204 compares the received (and decoded, if need be) persistent descriptors that form the query with persistent descriptors in the database to determine whether there is a sufficiently close match to declare a match between to two video segments. The process of comparing may include identifying pairs of persistent descriptors between the query segment and the database segment, determining Euclidean distance between paired descriptors, and assessing whether the differences between persistent descriptors is lower than a threshold level. That threshold level may be set based on the degree of concordance demanded by a particular application.

It will be appreciated that local descriptors extracted from a picture may be summarily represented as a single vector called the global descriptor for the picture. For example, each element in a global descriptor for a picture may indicate the number of local descriptors from the picture that are quantized to a member in a known set of descriptors, i.e. a vocabulary. In that case, the global descriptor is constructed as a histogram of the local descriptors given a vocabulary. For example, in some implementations, the global descriptor is formed using difference vectors obtained from every local descriptor and its match in the vocabulary set. The global descriptor is the final matrix reshaped to a long vector.

The benefit of having global descriptors for pictures is to allow a two-stage process in searching for a match in a large database, where simpler, shorter global descriptors are used exclusively in the first stage and local descriptors are used only if a match is found in the first stage.

The concept of a global descriptor for a picture may be extended to a global descriptor for a video segment. For example, given a vocabulary for a video segment, a histogram of the persistent descriptors in the segment may be constructed and used as the global descriptor for the video segment. Correspondingly, the following process may be used to search for a match:

1. In the first stage, the global descriptors from the query are compared against the stored global descriptors in the database, resulting in a set of video sequences as candidates that match the query.

2. In the second stage, the persistent descriptors are then used to perform a pairwise-matching process with the decoded descriptors of a reference video from the database Reference is now made to FIG. 4, which shows, in block diagram form, one example embodiment of a video feature extractor 300. This example embodiment relies on SIFT-based feature identification and extraction and optical flow-based motion estimation, but it will be appreciated that other implementations may use other feature extraction techniques and other motion estimation techniques.

Figure 4:
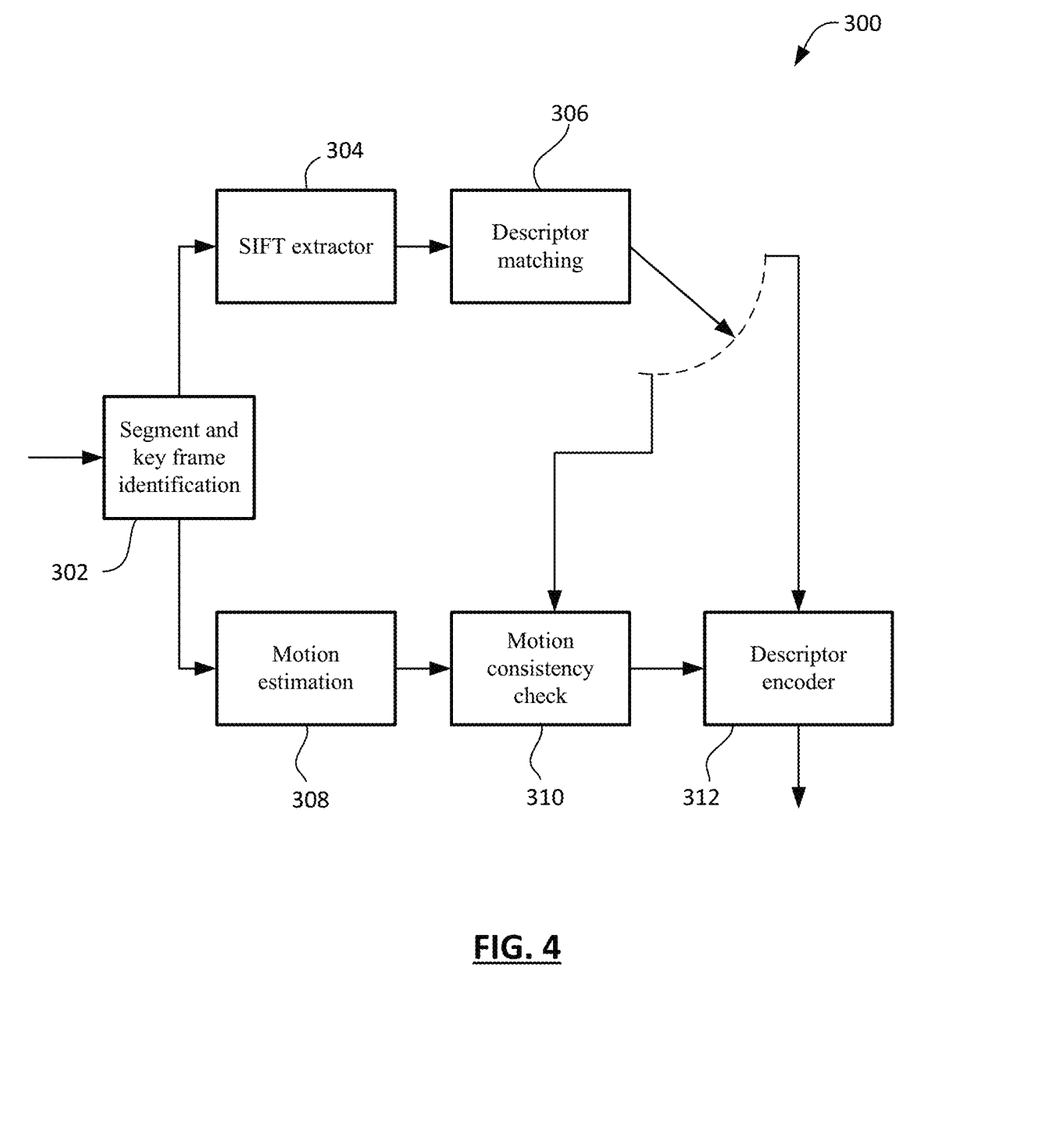
FIG. 4 shows, in block diagram form, an example embodiment of a video feature descriptor extractor.

The example video feature extractor 300 receives the video sequence as an input. A segmentation process 302 divides the video sequence into segments and identifies keyframes within each segment. A feature extractor, such as a SIFT extractor 304, then identifies features in the keyframes and extracts their descriptors. A matching process 306 is used to pair feature descriptors from the two keyframes of a segment. Meanwhile, a motion estimation process 308 determines the motion field between the two keyframes identified by the segmentation process 302. The motion field is then used to evaluate the pairs of feature descriptors for consistency with the motion field in a motion-consistency check process 310. If a pair of feature descriptors deviates from the motion field, then the pair may be discarded as a valid feature descriptor pair. In that sense, the motion-consistency check process 310 filters the set of pairs of feature descriptors generated by the matching process 306 to output a subset of pairs of feature descriptors that is consistent with the motion field of the segment.

The output subset of feature descriptors may then be stored in memory such as a local database or other data structure, or, as indicated in this example, may be encoded by a descriptor encoder 312 to produce an encoded bitstream of feature descriptors for the video.

Figure 5:
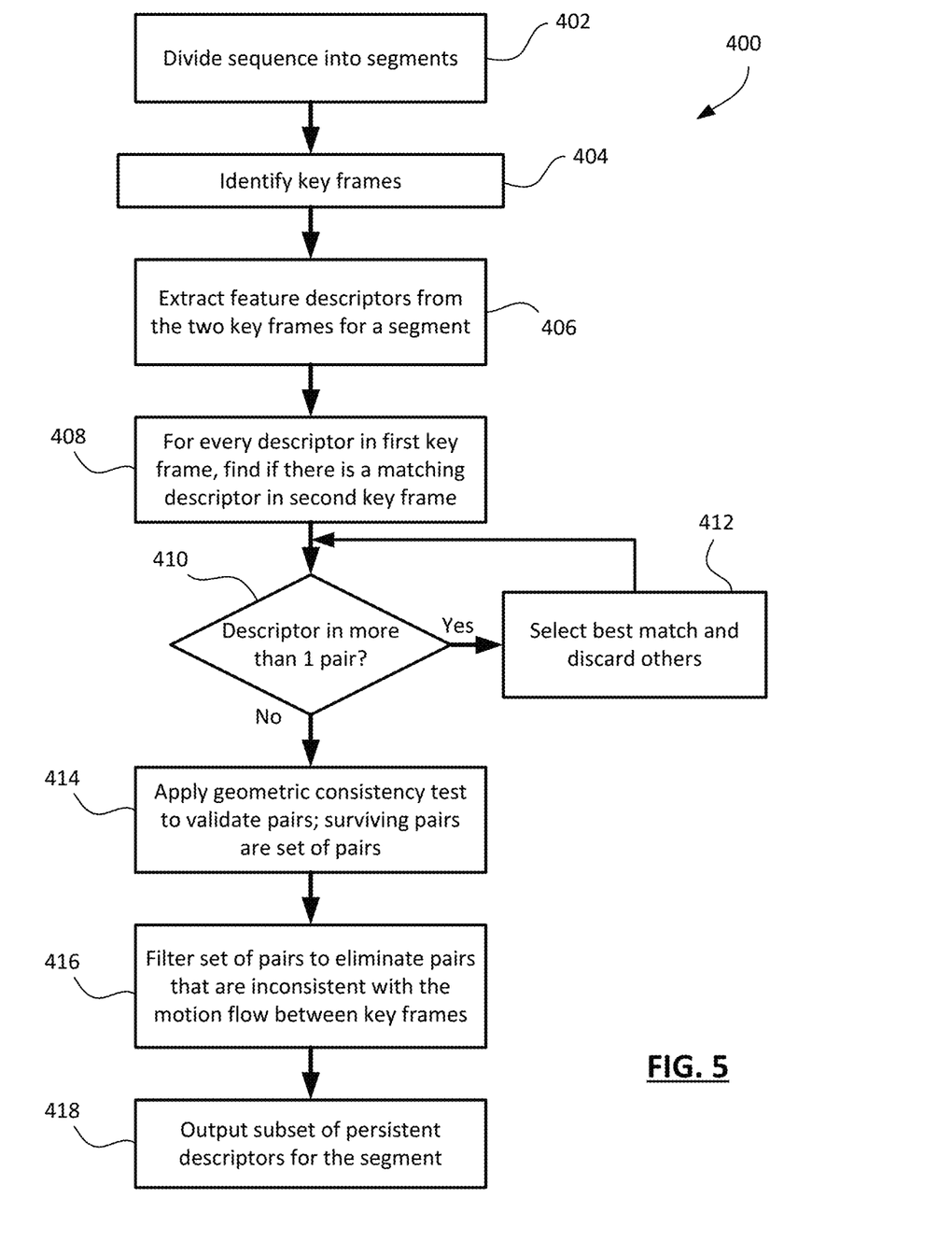
FIG. 5 shows a flowchart illustrating an example process for video feature descriptor extraction.

Reference will now be made to FIG. 5, which shows, in flowchart form, one example process 400 of extracting feature descriptors for a video. In this example process 200, the video sequence is first divided into segments, as indicated by operation 402. As noted above, scene change detection and other such analysis may be used to partition the sequence into segments. In some embodiments, the segments each contain a predetermined number of pictures/frames per segment.

In operation 404, keyframes are identified for each segment. In one example implementation, the keyframes (or "key pictures") are the first frame/picture of the segment and the last frame/picture of the segment. In another example implementation, the keyframes for a segment are the first frame/picture of the segment and the first frame/picture of the next segment in the sequence (the consecutive segment). The two keyframes of a segment may be designated $KF_1$ and $KF_2$ respectively, in the following description.

In operation 406, features descriptors are extracted from the keyframes. The extraction process may include SIFT or any other such image feature descriptor extracting process. Then, in operation 408, pairs of matching descriptors are found. In this example, for each descriptor in the first keyframe, the system finds whether a matching descriptor appears in the second keyframe. The matching may include testing descriptors in the second keyframe to determine whether there is a descriptor in that keyframe within a particular search window and that is sufficiently similar to the descriptor in the first keyframe. Similarity, in the case of a descriptor that is a multi-dimensional vector, may be measured in terms of Euclidean distance, in some cases. In an example implementation, pairs of descriptors are found by, for each descriptor extracted from the first keyframe, identifying a descriptor from the second key frame based on a minimizing Euclidean distance between them. In another example implementation, a ratio test is applied to determine if a match exists. For example, the ratio test may involve:

1. For each descriptor ($d_i$) from $KF_1$, find the Euclidean distances between this descriptor ($d_i$) and all descriptors in $KF_2$, and keep only the smallest two distances.

2. The ratio of the first smallest distance (first nearest descriptor to $d_i$) to the second smallest distance (second nearest descriptor to $d_i$) is computed:

$$r = \frac{dist_1}{dist_2}$$

where $dist_1$ and $dist_2$ are the first smallest and second smallest distances, respectively.

3. If r<0.8, descriptor $d_i$ from $KF_1$ is a match to the first nearest descriptor in $KF_2$ (found in the previous step). Otherwise, $d_i$ has no match in $KF_2$. In other words, for a candidate descriptor in the second keyframe to be matched to a descriptor from the first keyframe, it must be at least a 20% better match (in terms of Euclidean distance) than then next closest candidate descriptor in the second keyframe.

It will be appreciated that sensitivity of the determination of whether there is a match may be adjusted by adjusting the ratio outcome that is designated as a match. In the above example, a matching descriptor is identified if the ratio is <0.8, but other preset maximums may be used, such as 0.6 or 0.7, depending on how selective the system is intended to be in identifying matches. The maximum ratio may be selected through empirical testing in some cases.

The example matching process in which a matching descriptor in the second keyframe is sought for every descriptor in the first keyframe results in the possibility that more than one descriptor in the first keyframe may be matched to the same descriptor in the second keyframe, as indicated by operation 410. In the event that there are multiple pairs involving a match to the same descriptor from the second keyframe, in operation 412 the system determines the best match involving the same descriptor from the second keyframe and discards the other pairings. The best match may be evaluated in a number of ways. In one example, the quality of each of the matches is determined and the best of them is kept. The best match may rely on a comparison of Euclidean differences between the descriptors of the first keyframe and the descriptor in the second keyframe. In one example, the pairs are each given a score based on the ratio test of operation 408. For instance, each pair may be scored based on the following expression in which r is the result of the ratio test in operation 408:

$$\beta = \cos\left(\frac{r\pi}{2}\right)$$

The descriptor from $KF_1$ that has the highest score $\beta$ with the descriptor from $KF_2$ is declared as the best match. Thus, unique pairs of descriptors are generated, i.e., a descriptor from $KF_2$ matches only one descriptor from $KF_1$.

In operation 414, a geometric consistency test may be applied to validate the pairs of descriptors. Those that do not pass the geometric consistency test are eliminated from the set of pairs of descriptors for the segment. An example of a geometric consistency test is provided in N14961, "Test Model 12: compact descriptors for visual search," 2014, the contents of which are hereby incorporated by reference. This test checks whether the pair of descriptors likely represent the same regions in two frames. After finding the initial set of M matching pairs, $S_{initial\_matches} = \{(d^{KF1}, d^{KF2})_1, \ldots, (d^{KF1}, d^{KF2})_M\}$, a matrix of Log Distance Ratios (LDR) called Z may be constructed. Every entry in Z represents the following ratio:

$$z_{i,j} = \log \frac{\|x_i - x_j\|}{\|y_i - y_j\|}$$

In the above expression, $x_i$ and $y_i$ are the coordinates of the $i^{th}$ matching pair in $S_{initial\_matches}$, and $x_j$ and $y_j$ are the coordinates of the $j^{th}$ matching pair in the same set $S_{initial\_matches}$. A histogram of the values in the matrix Z may be constructed and checked against a known-outlier probability distribution using, for example, Pearson's goodness-of-fit test.

In operation 416, the system may determine the motion field from the first keyframe to the second keyframe and may evaluate each pair in the set of pairs of descriptors for consistency with the determined motion field. Pairs that are too inconsistent with the motion field are discarded, resulting in a subset of pairs of descriptors that may be designated as the persistent descriptors for that segment of the video. That subset of persistent descriptors, in particular the first descriptor in each pair, is then output in operation 418. It will be appreciated that it is the descriptors of the first keyframe that are output as the persistent descriptors for a particular segment.

Figure 6:
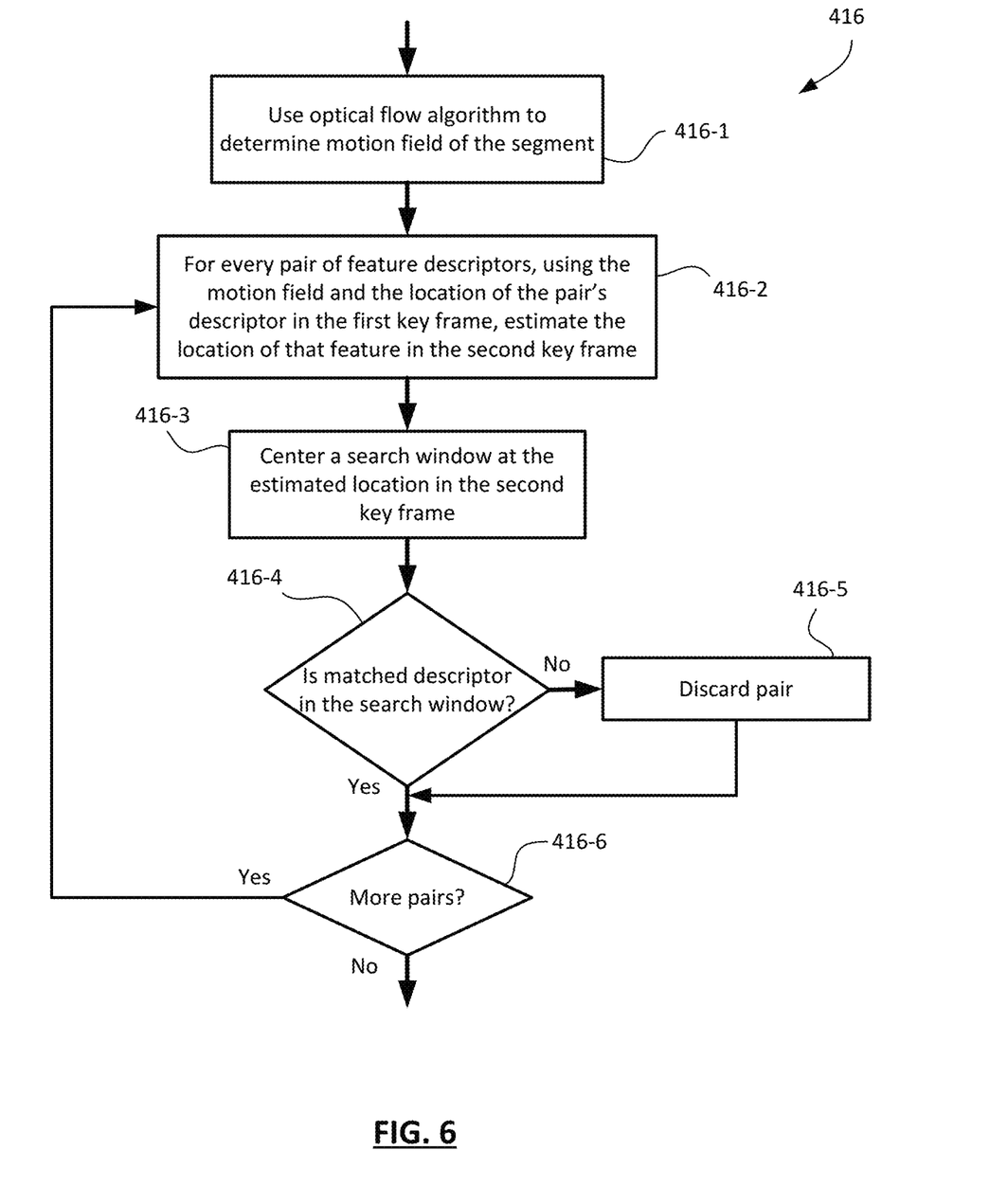
FIG. 6 shows a flowchart illustrating an example process for motion-consistency assessment of pairs of video feature descriptors.

FIG. 6 shows, in flowchart form, one example implementation of operation 416 relating to motion-consistency testing. In general, motion-consistency testing involves assessing whether individual pairs of descriptors generally conform (in terms of their relative locations in the frames) to the motion field between the frames. In this example, the system uses an optical flow algorithm to determine the motion field of the segment, as indicated by operation 416-1. One example of an optical flow algorithm is described in B. D. Lucas and T. Kanade, "An Iterative Image Registration Technique with an Application to Stereo Vision," in *International Joint Conference on Artificial Intelligence,* 1981, but other such algorithms may be used.

In operation 416-2, the system starts with a descriptor in the first keyframe and uses the motion field to pinpoint an estimated location for that feature location in the second keyframe. A search window is established around that estimated location in the second keyframe, as indicated by operation 416-3. Then, in operation 416-4, the system determines whether the matching descriptor from the pair falls inside of the search window. If so, then it generally conforms to the motion field. If not, then it deviates too far from the motion field and, in operation 416-5, it is discarded. This may be thought of as filtering the set of pairs of descriptors to remove those that are too inconsistent with the motion field. As indicated by operation 416-6, the operation is performed for each pair of descriptors identified for the segment.

As noted above, criteria may be set for evaluating the pairwise matching capability of a feature descriptor extraction scheme. One example uses True Positive (TP) and False Positive (FP) Rates. They are given by the following two equations:

$$TPR=TP/(TP+FN)$$

$$FPR=FP/(FP+TN),$$

where:

TP is the number of true positives. A true positive occurs when the tested two segments are declared a match while they, in fact, match each other.

FN is the number of false negatives. A false negative occurs when the tested two segments are declared a non-matching pair while they match each other.

FP is the number of false positives. A false positive occurs when the tested two segments are declared a match while they are not.

TN is the number of true negatives. A true negative occurs when the tested two segments are declared a non-matching pair while they are not matching each other.

An embodiment of the presently-described solution achieves good TPR and FNR without imposing any restrictions on the average descriptor lengths per second at the output of the video feature extractor (no upper bound on the output bit rate). The experiments were implemented with the assumption that the approximate persistent set is perfectly recoverable at the decoder, i.e., a lossless encoding scheme is used. The recorded TPR and FPR were 99% and less than 1%, respectively, in testing.

Figure 7:
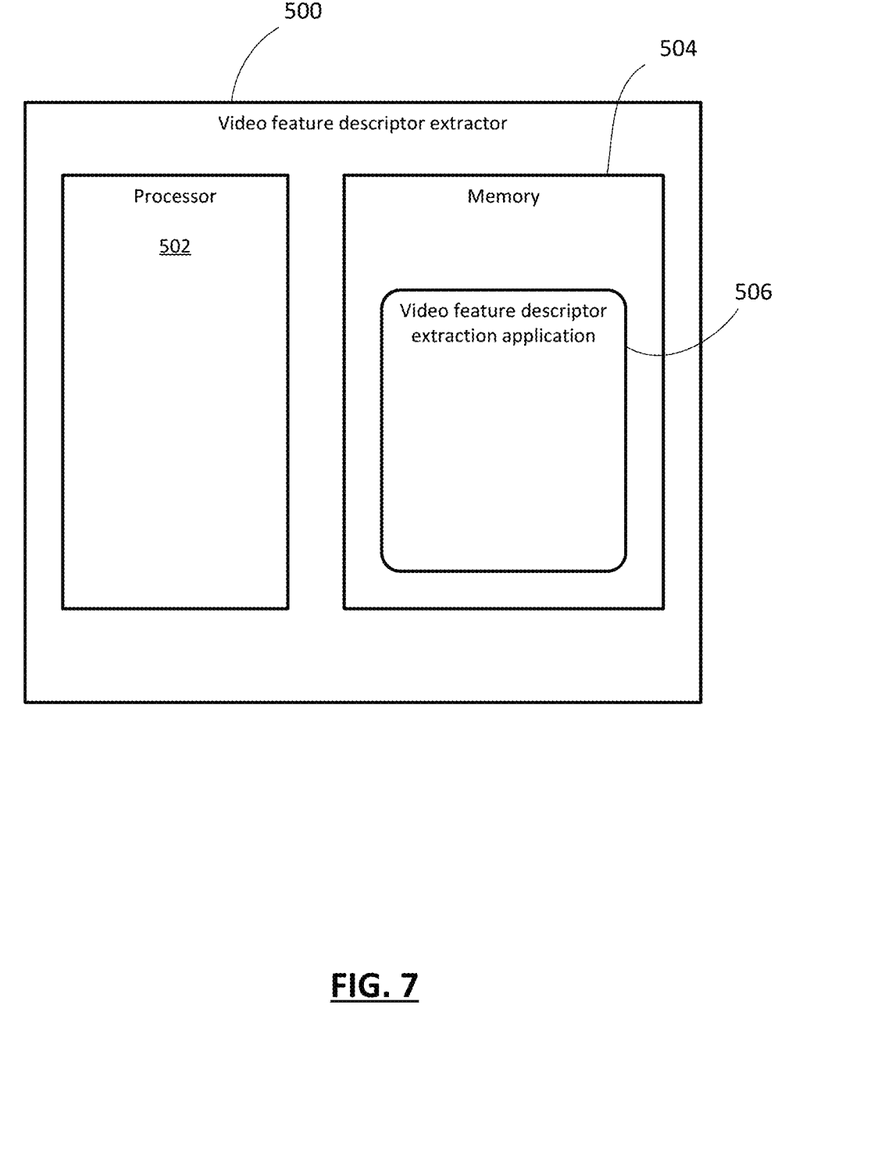
FIG. 7 shows an example simplified block diagram of a video feature descriptor extractor.

Reference is now made to FIG. 7, which shows a simplified block diagram of an example embodiment of a video feature extractor 500. The encoder 500 includes a processor 502, memory 504, and a video feature descriptor extraction application 506. The application 506 may include a computer program or application stored in memory 504 and containing instructions that, when executed, cause the processor 502 to perform operations such as those described herein. For example, the application 506 may identify and extract sets of persistent feature descriptors in accordance with the processes described herein. In some implementations, the application 506 may encode the sets of persistent feature descriptors and output them as an encoded bitstream. It will be understood that the application 506 may be stored in on a non-transitory computer-readable medium, such as a compact disc, flash memory device, random access memory, hard drive, etc. When the instructions are executed, the processor 502 carries out the operations and functions specified in the instructions so as to operate as a special-purpose processor that implements the described process(es). Such a processor may be referred to as a "processor circuit" or "processor circuitry" in some examples.

It will be appreciated that the video feature extractor according to the present application may be implemented in a number of computing devices, including, without limitation, servers, suitably-programmed general purpose computers, audio/video encoding devices, and mobile devices. The video feature extractor may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the video feature extractor described herein and the module, routine, process, thread, or other software component implementing the described method/process for configuring the video feature extractor may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of extracting feature descriptors for a video, in a video feature descriptor extractor, the video including a sequence of pictures, the method comprising:
   identifying a first key picture and a second key picture later in the sequence than the first key picture and having at least one picture between them;
   extracting a first set of feature descriptors from the first key picture and a second set of feature descriptors from the second key picture;
   identifying a set of pairs of feature descriptors, where each pair includes one descriptor from the first set and one descriptor from the second set;
   generating motion field information describing a motion field between the first key picture and the second key picture; and
   filtering the set of pairs of feature descriptors based on correlation with the motion information to produce and output a subset of persistent descriptors, wherein filtering the set of pairs of feature descriptors includes discarding, from the set, one or more pairs of feature descriptors based on a determination of whether the pairs are consistent with the motion field, a pair of feature descriptors being consistent with the motion field if relative locations of the descriptors of the pair in their respective key picture conform to the motion field.

2. The method claimed in claim 1, wherein identifying the set of pairs of feature descriptors comprises, for each descriptor in the first set, identifying a descriptor in the second set based on minimizing Euclidean distance between the descriptor from the first set and the descriptor from the second set, and designating them as one of the pairs in the set of pairs of feature descriptors.

3. The method claimed in claim 1, wherein identifying the set of pairs of feature descriptors comprises, for each descriptor in the first set, determining whether there is a matching descriptor in the second set and, if so, designating them as one of the pairs of feature descriptors.

4. The method claimed in claim 3, wherein determining whether there is a matching descriptor comprises, for a descriptor in the first set, identifying the closest descriptor in the second set based on a first Euclidean distance from the descriptor in the first set, identifying the second closest descriptor in the second set based on a second Euclidean distance from the descriptor in the first set, and designating the closest descriptor as the matching descriptor if the ratio of the first Euclidean distance to the second Euclidean distance is less than a preset maximum.

5. The method claimed in claim 4, wherein the preset maximum is less than 0.8.

6. The method claimed in claim 1, wherein identifying the set of pairs of feature descriptors includes determining that two or more pairs of feature descriptors include the same descriptor in the second key picture and, based on that determination, scoring the quality of each of said two or more pairs of feature descriptors, retaining the highest quality pair, and discarding the remaining pairs of the two or more pairs of feature descriptors.

7. The method claimed in claim 1, wherein generating motion field information includes using an optical flow algorithm to determine relative movement between areas of the first key picture and areas of the second key picture.

8. The method claimed in claim 1, wherein filtering the set of pairs of feature descriptors includes, for each pair,
determining, based on the motion information and a location of pair's descriptor from the first key picture, an estimated location in the second key picture;
determining whether the pair's descriptor from the second key picture is located within a search window centered on the estimated location; and
if so, retaining the pair in the subset of persistent descriptors, and
if not, excluding the pair from the subset of persistent descriptors.

9. The method claimed in claim 1, wherein extracting comprises applying a Scale-Invariant Feature Transform (SIFT) algorithm to the first key picture and to the second key picture.

10. The method claimed in claim 1, wherein identifying comprises dividing the sequence of pictures into segments, each segment having a respective first key picture and a respective second key picture.

11. The method claimed in claim 10, wherein each segment contains a respective series of pictures, the respective first key picture of each segment is a first picture in its series, and the respective second key picture for each segment is a first picture in the subsequent segment in the sequence.

12. A video feature descriptor extractor for extracting feature descriptors for a video, the video including a sequence of pictures, the video feature descriptor extractor comprising:
a processor;
memory; and
an encoding application containing instructions executable by the processor that, when executed, cause the processor to
identify a first key picture and a second key picture later in the sequence than the first key picture and having at least one picture between them;
extract a first set of feature descriptors from the first key picture and a second set of feature descriptors from the second key picture;
identify a set of pairs of feature descriptors, where each pair includes one descriptor from the first set and one descriptor from the second set;
generate motion field information describing a motion field between the first key picture and the second key picture; and
filter the set of pairs of feature descriptors based on correlation with the motion information to produce and output a subset of persistent descriptors, wherein filtering the set of pairs of feature descriptors includes discarding, from the set, one or more pairs of features descriptors based on a determination of whether the pairs are consistent with the motion field, a pair of feature descriptors being consistent with the motion field if relative locations of the descriptors of the pair in their respective key picture conform to the motion field.

13. The video feature descriptor extractor claimed in claim 12, wherein the processor is to identify the set of pairs of feature descriptors by, for each descriptor in the first set, identifying a descriptor in the second set based on minimizing Euclidean distance between the descriptor from the first set and the descriptor from the second set, and designating them as one of the pairs of feature descriptors.

14. The video feature descriptor extractor claimed in claim 12, wherein the processor is to identify the set of pairs of feature descriptors by, for each descriptor in the first set, determining whether there is a matching descriptor in the second set and, if so, designating them as one of the pairs of feature descriptors.

15. The video feature descriptor extractor claimed in claim 14, wherein the processor is to determine whether there is a matching descriptor by, for a descriptor in the first set, identifying the closest descriptor in the second set based on a first Euclidean distance from the descriptor in the first set, identifying the second closest descriptor in the second set based on a second Euclidean distance from the descriptor in the first set, and designating the closest descriptor as the matching descriptor if the ratio of the first Euclidean distance to the second Euclidean distance is less than a preset maximum.

16. The video feature descriptor extractor claimed in claim 15, wherein the preset maximum is less than 0.8.

17. The video feature descriptor extractor claimed in claim 12, wherein the processor is to identify the set of pairs of feature descriptors by determining that two or more pairs of feature descriptors include the same descriptor in the second key picture and, based on that determination, scoring the quality of each of said two or more pairs of feature descriptors, retaining the highest quality pair, and discarding the remaining pairs of the two or more pairs of feature descriptors.

18. The video feature descriptor extractor claimed in claim 12, wherein the processor is to generate motion field information by using an optical flow algorithm to determine relative movement between areas of the first key picture and areas of the second key picture.

19. The video feature descriptor extractor claimed in claim 12, wherein the processor is to filter the set of pairs of feature descriptors by, for each pair,
determining, based on the motion information and a location of pair's descriptor from the first key picture, an estimated location in the second key picture;
determining whether the pair's descriptor from the second key picture is located within a search window centered on the estimated location; and
if so, retaining the pair in the subset of persistent descriptors, and
if not, excluding the pair from the subset of persistent descriptors.

20. The video feature descriptor extractor claimed in claim 12, wherein the processor is to extract feature descriptors by applying a Scale-Invariant Feature Transform (SIFT) algorithm to the first key picture and to the second key picture.

21. The video feature descriptor extractor claimed in claim 12, wherein the processor is to identify a first key picture and a second key picture by dividing the sequence of pictures into segments, each segment having a respective first key picture and a respective second key picture.

22. The video feature descriptor extractor claimed in claim 21, wherein each segment contains a respective series of pictures, the respective first key picture of each segment is a first picture in its series, and the respective second key picture for each segment is a first picture in the subsequent segment in the sequence.

23. A non-transitory processor-readable medium storing processor-executable instructions for extracting feature descriptors for a video, the video including a sequence of pictures, wherein the processor-executable instructions, when executed by a processor in a video feature descriptor extractor, cause the processor to:
  identify a first key picture and a second key picture later in the sequence than the first key picture and having at least one picture between them;
  extract a first set of feature descriptors from the first key picture and a second set of feature descriptors from the second key picture;
  identify a set of pairs of feature descriptors, where each pair includes one descriptor from the first set and one descriptor from the second set;
  generate motion field information describing a motion field between the first key picture and the second key picture; and
  filter the set of pairs of feature descriptors based on correlation with the motion information to produce and output a subset of persistent descriptors, wherein filtering the set of pairs of feature descriptors includes discarding, from the set, one or more pairs of features descriptors based on a determination of whether the pairs are consistent with the motion field, a pair of feature descriptors being consistent with the motion field if relative locations of the descriptors of the pair in their respective key picture conform to the motion field.

* * * * *